United States Patent
Crutchfield

(10) Patent No.: US 9,351,118 B2
(45) Date of Patent: May 24, 2016

(54) APPARATUS, SYSTEMS AND METHODS FOR VISUALLY CONNECTING PEOPLE

(71) Applicant: Keith Crutchfield, Los Angeles, CA (US)

(72) Inventor: Keith Crutchfield, Los Angeles, CA (US)

(*) Notice: Subject to any disclaimer, the term of this patent is extended or adjusted under 35 U.S.C. 154(b) by 0 days.

(21) Appl. No.: 14/251,368

(22) Filed: Apr. 11, 2014

(65) Prior Publication Data

US 2015/0296340 A1   Oct. 15, 2015

(51) Int. Cl.
*H04W 4/02* (2009.01)
*G06F 3/0481* (2013.01)
*H04N 5/232* (2006.01)
*G06Q 50/00* (2012.01)

(52) U.S. Cl.
CPC ........... *H04W 4/023* (2013.01); *G06F 3/04817* (2013.01); *G06Q 50/01* (2013.01); *H04N 5/23216* (2013.01); *H04W 4/026* (2013.01)

(58) Field of Classification Search
None
See application file for complete search history.

(56) References Cited

U.S. PATENT DOCUMENTS

| | | | |
|---|---|---|---|
| 8,275,397 B2* | 9/2012 | Huston | A63B 24/0021 345/633 |
| 8,284,748 B2* | 10/2012 | Borghei | H04W 4/021 370/252 |
| 8,417,261 B2 | 4/2013 | Huston | |
| 8,436,872 B2 | 5/2013 | Wright et al. | |
| 8,611,601 B2 | 12/2013 | Calman et al. | |
| 2008/0036653 A1* | 2/2008 | Huston | G01S 19/14 342/357.52 |
| 2010/0328344 A1* | 12/2010 | Mattila | G06F 1/626 345/633 |
| 2011/0037712 A1* | 2/2011 | Kim | H04M 1/7253 345/173 |
| 2012/0323488 A1 | 12/2012 | Callaghan | |
| 2013/0005362 A1* | 1/2013 | Borghei | 455/456.3 |
| 2013/0040660 A1* | 2/2013 | Fisher | G06Q 308/02 455/456.1 |
| 2013/0072221 A1* | 3/2013 | Chen | H04W 4/14 455/456.1 |
| 2013/0102257 A1* | 4/2013 | Bedi | H04W 4/005 455/66.1 |
| 2013/0170697 A1 | 7/2013 | Zises | |
| 2014/0011487 A1* | 1/2014 | Hwang | G06K 9/00221 455/416 |
| 2014/0013446 A1* | 1/2014 | Patvarczki | H04L 67/24 726/28 |

* cited by examiner

*Primary Examiner* — Hilina K Demeter
(74) *Attorney, Agent, or Firm* — CIONCA Law Group P.C.; Marin Cionca

(57) ABSTRACT

A method for visually finding and interacting with people, operable on a computing system including a server and a mobile device comprising a processor, a display and a camera, the method comprising: detecting the current location of members of a group, which a user of the mobile device has created or is a member of, if the group members have similar mobile devices and if they have set to permit their visibility when the user or other group members wish to locate them by scanning their surroundings with the camera of their mobile device; and, for each group member detected while the user is scanning user's surroundings, and having a position falling in the direction the mobile device's camera points to at a particular moment, displaying on the mobile device's display a group member representation associated with the group member's position.

20 Claims, 15 Drawing Sheets

419

419c

409db

409dc

FIG. 31    412
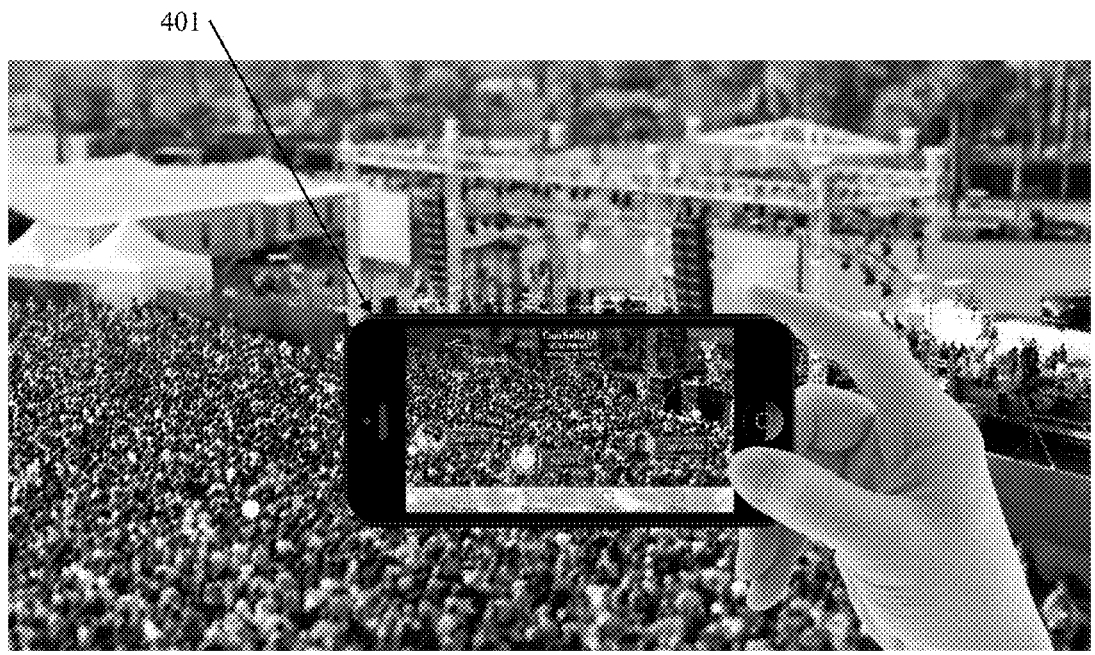
FIG. 32

APPARATUS, SYSTEMS AND METHODS FOR VISUALLY CONNECTING PEOPLE

BACKGROUND OF THE INVENTION

1. Field of the Invention

The invention relates generally to mobile technology and more particularly to an apparatus, system and methods for visually connecting people in real time.

2. Description of the Related Art

Oftentimes, people participate in large and crowded events (e.g., music festivals, sporting events, etc) or activities that take place in large spaces such as a mall, theme park, college campus, and so on. A problem the participants are facing is getting lost or separated from the group they are part of (e.g., family, friends group, etc). Another problem is that the participants have limited options of socially interacting with their group while at these events. Thus, there is a need for a new apparatus, system and methods for visually connecting people, to solve the above problems.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The apparatus, systems and methods disclosed herein are designed to visually connect groups of friends, families and colleagues in large crowded environments like music festivals, theme parks, sporting events, conventions, etc. The core function is achieved through an algorithm of augmented reality, 3D GPS mapping and other specialized technologies, as disclosed herein. They allow users to privately view, in real time and 3D space, the precise location of each friend by displaying a profile icon on the screen of their mobile device. As such they enhance the user's experience at these events for example by reducing the anxiety of getting separated or lost.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIGS. 4-31 illustrate a collection of examples of user actions that can be performed on a user's mobile apparatus when using the system and method for visually connecting people, according to several embodiments.

FIG. 32 illustrates an example of use of an apparatus and method for visually connecting people, according to an embodiment.

DETAILED DESCRIPTION OF THE PREFERRED EMBODIMENTS

Figure 1:
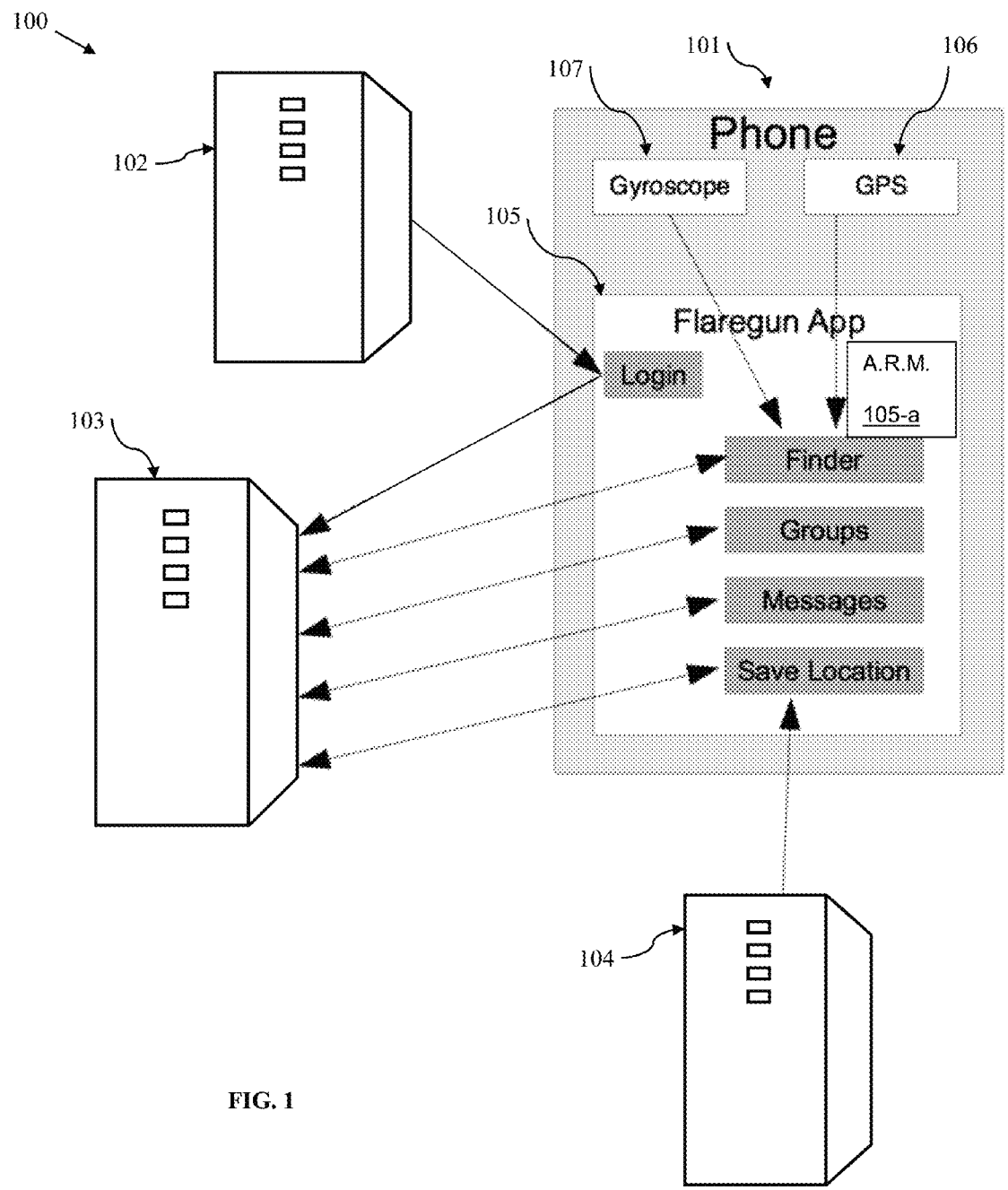
FIG. 1 illustrates a diagrammatic view of a system for visually connecting people, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

As used herein and throughout this disclosure, the term "mobile device" refers to any electronic device capable of communicating across a mobile network. A mobile device may have a processor, a memory, a transceiver, an input, and an output. Examples of such devices include cellular telephones, smart phones, tablet computers, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH® networks, with communication being enabled by transceivers. A network typically includes a plurality of elements such as servers that host logic for performing tasks on the network. Servers may further be in communication with databases and can enable mobile devices to access the contents of a database. Mobile devices may also communicate with each other via peer-to-peer or multipeer connection technology, which may use WiFi and/or BLUETOOTH® peer-to-peer connections to communicate with each other without a network connection.

FIG. 1 illustrates a diagrammatic view of a system 100 for visually connecting people, according to an embodiment. As shown, the system 100 may include several servers, which may be connected to a network, such as the internet. A mobile device 101, such as a smart phone (e.g., iPhone®), may be used by a user to connect to the system's servers and to performed the functions related to visually connecting with people, as it will be described hereinafter.

The server 102 may, for example, be an API server of a social media site, such as Facebook™, and may be used to enable the user to login the visual connection application ("application,") disclosed herein, by using the login credentials of the user for the respective social media site. An advantage of using such application login is that it gives the user the option of pulling friends list, photos or other data into the application. Alternatively, the user may create a login profile and then login using a visual connection server ("application server") 103, which may be dedicated to run the application's server portion ("server application"), in the form of an application or website, for example.

The visual connection application may contain mobile device logic 105 ("Flaregun app", "mobile device app"), which may be downloadable by a user into her mobile device 101, and server logic ("server application"), that will typically be preinstalled on the visual connection server 103. As shown, the Flaregun app 105 may be configured to communicate with the application server 103 and other servers (102 and 104) to enable the mobile device 101 to perform the functions related to visually connecting with people, as it will be described hereinafter. In addition, the mobile device app 105 may communicate with the social media server 102 for the purposes described above.

The mobile device app 105 may also communicate with a location server 104, such as a Google™ Maps API server, to support the bird's eye view of the mobile device 101.

The mobile device 101, may be equipped with a GPS module 106 to determine the position (e.g., longitude and latitude) and a gyroscope sensor 107 to determine the orientation (e.g., yaw, pitch, and roll) of the mobile device 101 and its camera (not shown), which may be needed for operation of the application as it will described in more details later herein.

Other sensors may be used in addition to or in combination with the gyroscope and the GPS module, such as an accelerometer or a compass, to determine the position and/or orientation of the mobile device 101.

The mobile device app 105 may use various buttons to enable a user to operate the application and enjoy its functions. Some example buttons are shown in FIG. 1: "Login", "Finder", "Groups", "Messages" and "Save Location." Other example buttons will be shown in and described when referring to the subsequent figures.

A "Finder" button for example may be used to launch the scope mode, the function and purpose of which will be described later herein. The functions associated with "Groups" and "Messages" buttons will also be described later herein when referring to some of the subsequent figures.

A "Save Location" button may be used typically in bird's eye view, when a graphic pin or icon may be displayed on a map (e.g., Google™ Maps, provided by location server 104) representing the current location/position of the user. When actuating this button, the current location of the user is saved on the map. This function may be useful in several instances. For example, a user may save her location when parking her car in large parking lot. Later, when returning to the car, the user could easily find her car by walking in the direction of the previously saved location pin or icon. The application may be configured to give the option to the user to name/label the saved location (e.g., "Car Location") by typing the respective name in a text box. Further, more than one location may be saved and labeled.

An augmented reality module (A.R.M.) 105-a is preferably built into the application and may be downloaded with the mobile device app 105 and may be configured to run on the mobile device 101.

Preferably, the application server 103 stores all user groups that were created by different users. For every user, her latest position (e.g., GPS location) may be stored on application server 103, preferably at login. User's GPS location is then preferably updated periodically (e.g., one time per second), by user's mobile device 101. Each time user's mobile device GPS 106 notifies the application of a location update, the location data is preferably being sent to and stored on the application server 103. When a user goes into the group section ("Groups" or "My Groups") of the mobile device app 105, and then selects a group from the shown group list (see FIGS. 5-6), a list of users/members in that group is preferably loaded into the user's mobile device 101, with their most recent coordinates (e.g., latitude and longitude). Those group users/members are preferably shown in scope mode using the augmented reality module (see for example FIG. 32).

Even if those group users/members are not in the visual proximity, as seen in FIG. 32 for example, of the user and of her mobile device 101, because they are many miles away, or because, if they are nearby, there is an obstruction that blocks the view (e.g., a wall, a building, a hill, etc), the information about those group members/users may still be displayed on user's mobile device in scope when scanning around, from left to right for example. Such information may include the group member's name, photograph, current location and/or distance. For example, if the user of the mobile device 101 is in Orange County, California, and sets her mobile device in scope mode, the group members/users (e.g., user's friends) will preferably still show up in scope view, when the mobile device is pointed in the direction where the respective friend is at that time (e.g., when the mobile device is pointed in the direction of Los Angeles, this information may be shown: John Doe, Los Angeles, 25 miles, or, John Doe, Los Angeles, 34.0500° N, 118.2500° W, 25 miles). Thus, the user's mobile device's camera may not need to actually see the physical location of the group member (e.g., the actual street in Los Angeles), such as when the group member is far away; it needs only to be pointed in that direction, and location and other information about that group member may still be displayed in scope. Similarly, same group members/users and information about them may also be seen in the bird's eye view, depending on the view range the user has set.

Thus, the users who wish to use the application, including the users who wish to be shown/located in scope view, would typically need to establish server connection, via the internet for example, be logged into the application and have the GPS function 106 enabled on their mobile device 101. However, alternatives technologies, such as multipeer technology, may potentially be used to achieve similar results.

Preferably, the data about the groups, users, their location, etc, is stored on application server 103 and then loaded by the user mobile devices 101 that need it.

Figure 2:
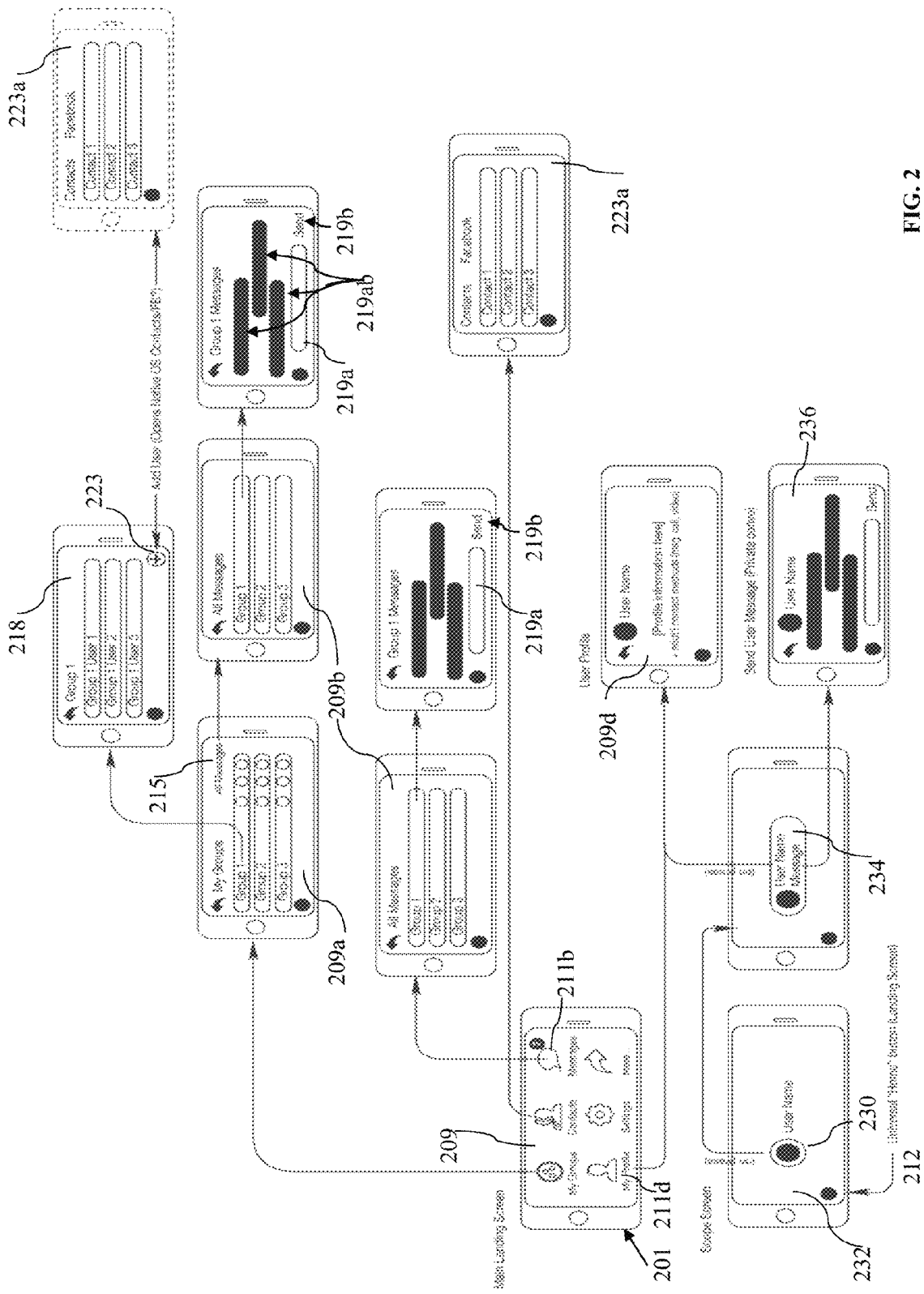
FIG. 2 illustrates a diagrammatic view of an architectural example of the system and process for visually connecting people, as seen on a user's device, according to an embodiment.

FIG. 2 illustrates a diagrammatic view of an architectural example of the system and process for visually connecting people, as seen on a user's device (i.e., user interface), according to an embodiment. As shown, a user may be provided on her mobile device 201 with a main landing screen 209, which may include various application buttons such as "My Groups", "Contacts", "Messages", "My Profile", "Settings" and a "More . . . " button, to reveal additional buttons when activated. Other buttons may be placed on the main landing screen as well, such as "Invites", to show the number of invitations sent or received to join groups.

When the user selects/activates (e.g., by pressing, touching or swiping) the "My Groups" button, a groups' screen 209a will preferably open, on which a list of groups the user has created or is part of will be displayed.

Next, when the user selects a group (e.g., Group 1) from the group list, a screen 218 for that group will preferably open, listing all group members of that group and giving the user several options. One of such options may be to add members 223 to that group, which may open a contacts screen 223a, on which the user may add group members from his mobile device's contacts or from a social media site such as Facebook™. Similarly, the contacts screen 223a may also be accessed via the "Contacts" button on the main landing screen 209.

As shown, from the groups' screen 209a, the user may select an "All Messages" button 215 to access the groups' messages screen 209b, which may list information such as the number of messages (not shown) exchanged within each group. The groups' messages screen may also be accessed from the main screen 209 by selecting the "Messages" button 211b. From the groups' messages screen 209b, the user may select a group (e.g., Group 1) to view the messages exchanged 219ab within that group, and/or to send messages to the group by typing them into a message box 219a and then selecting a "Send" button 219b.

From the main screen 209, a user may also select the "My Profile" button 211d to view and edit her profile (e.g., name, age, preferences, etc) on a profile screen 209d.

When on the scope screen 232, a user may select a representation of a group member 230 (e.g., an icon) showing on the scope screen, to enlarge that group user's container 234, in order to view additional information about that user and/or to access optional interaction methods with that group member, such as by text messaging 236.

It should be noted that a universal application "Home" button 212 is preferably provided on all screens, other than the main screen, to enable the user to return to the main screen 209 at any time.

Figure 3:
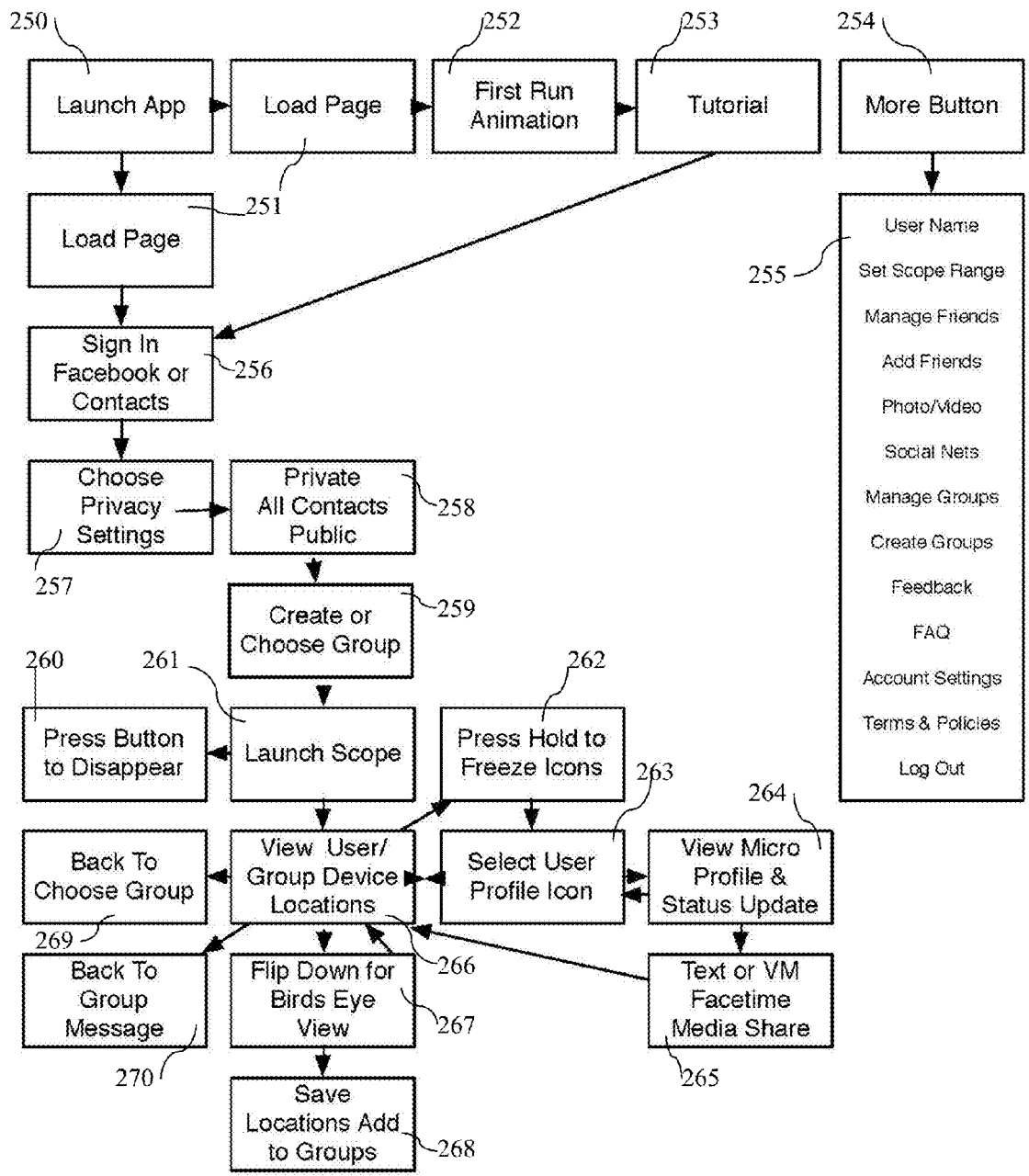
FIG. 3 is a flow chart depicting examples of user steps in a process for visually connecting with people, according to an embodiment.

FIG. 3 is a flow chart depicting examples of user steps in a process for visually connecting with people, according to an embodiment. As shown, a user may start the application by activating a launch button (step 250). Next, after a main landing page/screen of the application loads (step 251), the user may be presented with several options on how to proceed. For example, the user may be offered the option to first view a movie, run an animation (step 252) of the application, or go through a tutorial (step 253), both of which may be designed to educate the user on how the application works, and how to access its various features, such as scope, bird's eye view, friends finder, group video chat, and the other application features described in this disclosure. On the main landing screen, as well as on other application screens, a "More . . . " button may be offered to the user (step 254), which when selected may reveal various buttons such as the ones shown at 255. These buttons' functions are self-explanatory or are described hereinafter when referring to FIGS. 4-31.

Of particular importance may be the "Set Scope Range" button shown at 255. Using this button's function users can set the range (e.g., 0.5, 1, 5, 10, or 50 miles radius) of their accessibility (i.e., accessibility/range to find friends or range of their visibility to others, or both), which may be limited to the close range of an avenue for example, or broadened to a range of miles. A numerical indicator under each user icon visible in scope may indicate the approximate distance away. Users may also get an alert if they are within range of certain blocked or listed individuals.

Similarly, a bird's eye range may be set.

Also, the shown "Social Nets" button may be offered to allow the user to, for example, view two social network sites on a split screen and/or to post to such sites.

After the user lands on the main screen, the user may be asked to log in (Step 256) using the login credentials of one of user's social media sites (e.g., Facebook™), to log in by email, or to create login credentials in the application itself. Next, the user may be offered to add contacts (e.g., friends, family members, professional colleagues, etc) to the application, from user's social media sites (e.g., friends from Facebook™), or from the contacts stored on the user's mobile device, for example (step 256).

Next, the user may be presented with the option to set user's privacy preferences (step 257). The user may, for example, choose to be discoverable/visible by all application users (i.e., "Public" option in step 258), only by user's contacts (i.e., "All Contacts" option in step 258), or only by members of private groups (i.e., "Private" option in step 258), user created or is part of. Thus, users have complete control over who can view their location. Users can manage their visibility, limiting it to private invitation-only groups, Facebook™ friends for example, and/or all application users, which can be filtered by, for example, Facebook™ interests or specific event invitations. Or, users can disappear from sight at the touch of a button (step 260).

Next, the user may create groups or choose groups (step 259) to interact with as it will be described in more details hereinafter, when referring to FIGS. 4-32.

Next, the user may launch the scope (step 261), view group members' location in scope (step 266) and interact with groups and groups' members, such as described later when referring to FIGS. 22-32. By turning on the scope, the user can find her friends without saying a word. The user may then select (step 263) a group member's profile icon appearing in scope, to view (step 264) that group member's profile (e.g., name, age, etc) and/or to start (step 265) a text, audio, or video chat, or to exchange media (e.g., pictures) with that group member.

Application users may privately share photos, videos and/or comments with selected groups, person-to-person within a group, or across social networks of their choice. In addition to sharing on social media servers, users can choose to share content peer-to-peer via for example Bluetooth LE Think SnapChat™ but only the sender and receiver keep photo/video on their device. In this mode, no content is stored on servers.

Users using the application may also be able to post status updates (step 264) to multiple social networks directly from the application. The application may be configured to provide a split screen, horizontal layout, for the users to view two social sites of their choice simultaneously.

When in scope mode (step 266), the user of the application may freeze the screen (step 262) by pressing a "Hold" or "Pause" button. Freezing the screen may be useful so user can easily touch a group member's icon appearing in scope, to initiate contact without chasing them on screen.

From the scope screen, the user may navigate to group message screen (step 270), on which the user can view that group's messages and/or send messages to that group. The user may also choose to navigate to a "Choose Group" screen (step 269) to select a different group or to add a group to see in scope and interact with.

In scope, users can easily scan (e.g., left or right) and view the location of other application groups/users, in real time and 3D space on the screen of their hand held device via augmented reality. A compass may live in the top right corner of the screen to indicate all group members' location relative to each other and/or the direction the camera points to (e.g., north, east, etc).

From scope mode, or at any time after the application is launched, a user may be allowed to flip/tilt down (step 267) her mobile device for bird's eye view, and optionally, save locations (step 268) showing up on the displayed map. For example, the user may want to save her location when parking her car, when next to a tent or a preferred location, for easy finding later.

In scope mode, bird's eye mode, or at any time after launching the application, the user may be permitted to press a button to disappear (step 260), such as that she is not discoverable/visible by the other application users.

The user may also add groups to create, be part of or interact with, as described in more details hereinafter when referring to FIGS. 4-32. The user may invite/create and manage various private groups or individuals to view in scope mode. Invitation recipients may get a text and/or appropriate welcoming email message. Creating a group is like inviting friends to your party and makes you the host. You control who is in each group. It is like hitting a reset for your Facebook™ friends, pairing them down into manageable groups.

Group Admin can create an on-screen ticker scroll message specific to each group. Thus, a festival command center for example would preferably be able to override this message on all devices in the event of an emergency for example.

Figure 4:
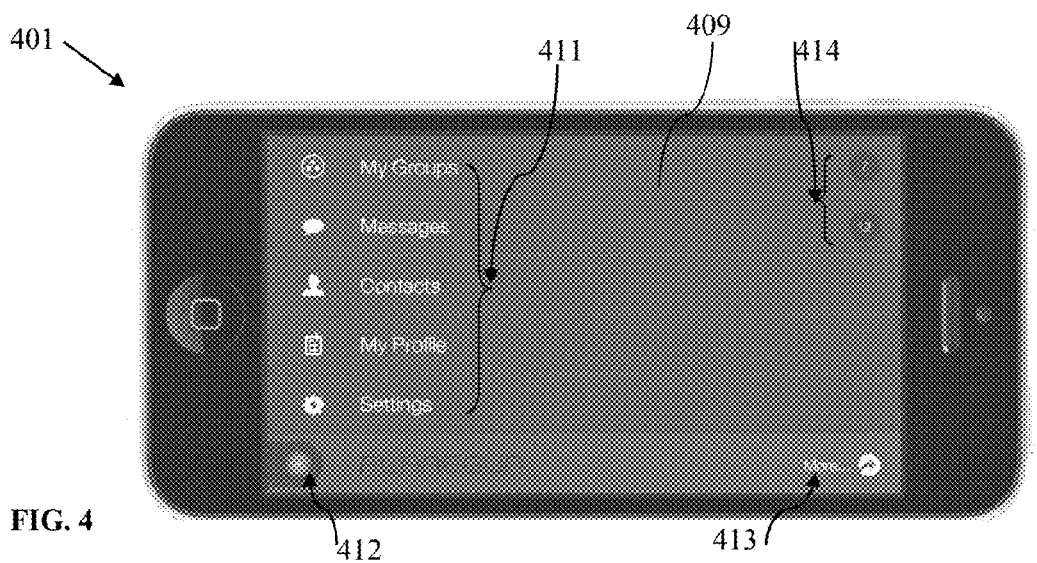

FIGS. 4-31 illustrate a collection of examples of user actions that can be performed on a user's mobile apparatus when using the system and method for visually connecting people, according to several embodiments. FIG. 4 shows a mobile device 40*l* displaying the application's main menu screen 409. As shown, several main buttons 411 may be provide, for the user to activate by tapping, swiping, touching, pressing or the like. Additional application buttons, such as "Log Out", "FAQ" or the like may revealed by activating the "More . . . " button 413. As shown, the main menu screen 409 may also display additional data 414, such as how many groups were created by the user and/or the user is part of, how many unread messages were received, and so on. The main menu screen 409, as well as several other application screens described below, may also display a main menu or home button 412, which the user may activate to conveniently return to the main menu screen, when so desired.

Figure 5:
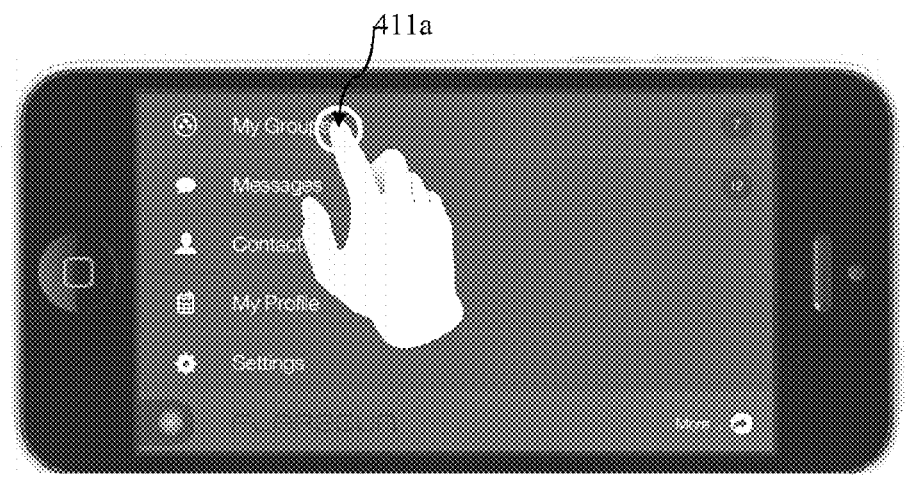
Figure 6:
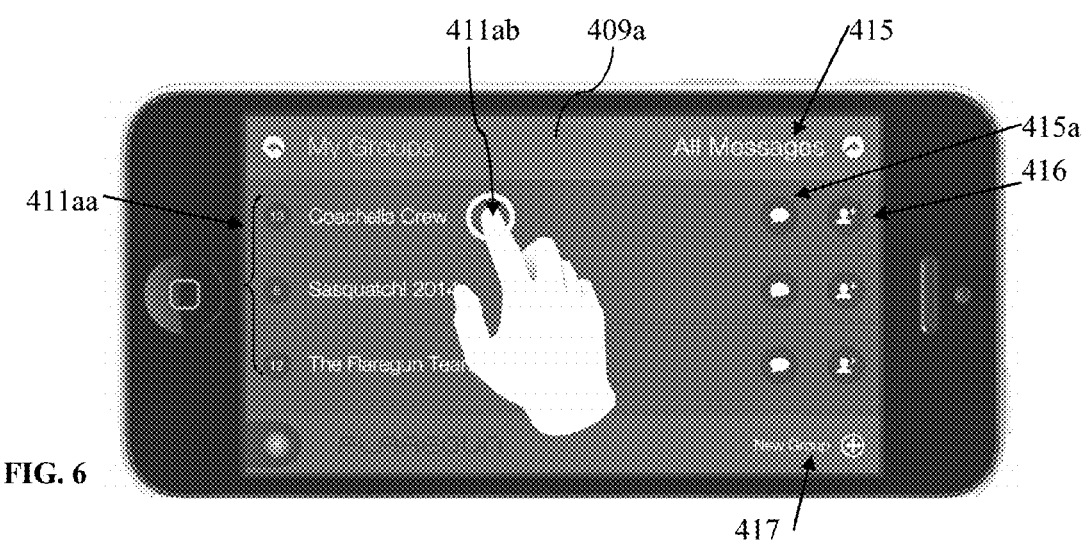
Figure 7:
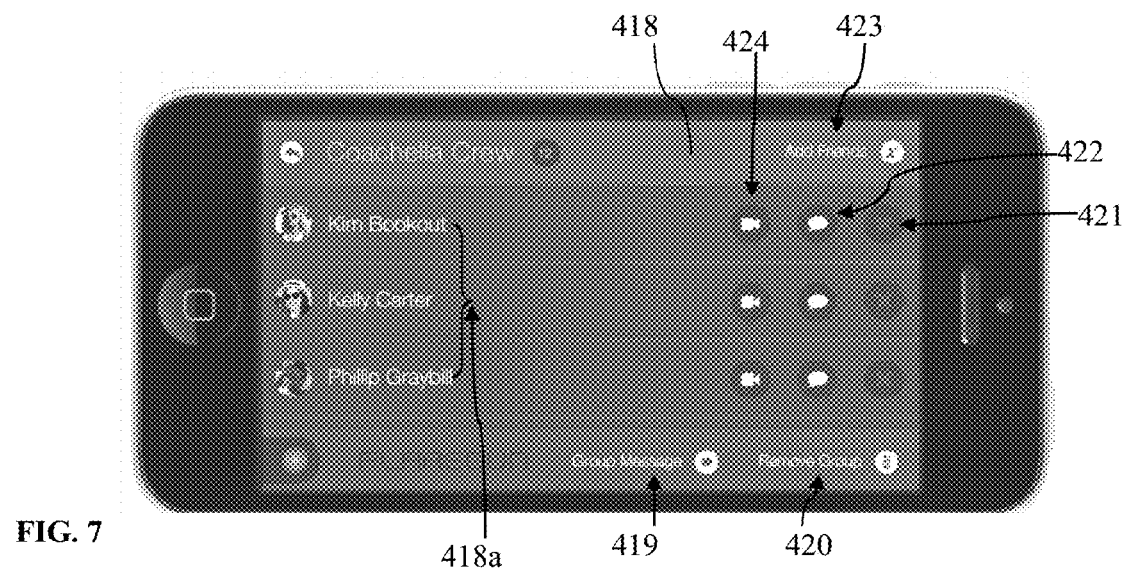
Figure 8:
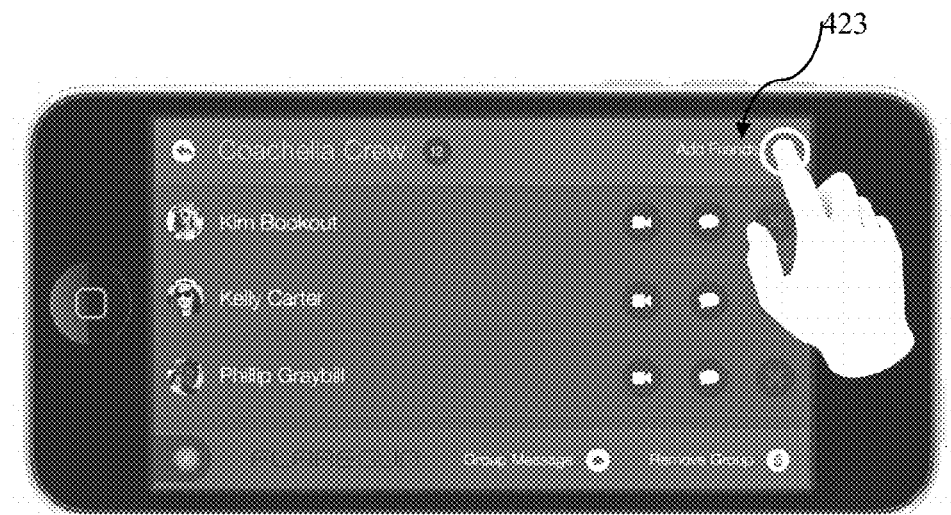

Referring now to FIGS. 5-7, a user may select "My Groups" 411*a* to view, on a group list screen 409*a*, a list 411*aa* of all groups the user has created or is part of. As shown, the list 411*aa* may include the names of the groups and the number of members in each group. On the group list screen 409*a*, the user may be provided with the several options, such as to view all messages 415 sent and/or received from all groups, send a message 415*a* to a particular group from the list, add additional members 416 to a particular group or create a new group 417. Additionally, the user may select a group 411*ab* (FIG. 6) to view that group's screen 418 (FIG. 7).

When on a group's screen 418, a group member list 418*a* may be displayed. The group member list 418*a* may include the names of the group members and a photograph of each user. As indicated earlier, when a user logs in the application using her Facebook™ credentials, the user's name and/or photograph may be retrieved from her Facebook™ page. When on a group's screen 418, a user may add friends 423 to the group, start a video chat 424 with a group member, send a message 422 to a group member, delete a member 421 from the group (if the user is the one who created the group), view or send group messages 419 or remove this group 420 from his group list.

Figure 9:
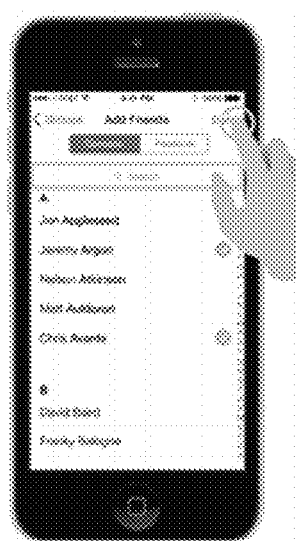

When the user selects to add friends 423 (FIG. 8), the application may be configured to open a screen (FIG. 9) on which the user may select friends to add from his mobile device's contact list or the user may be given the option to select friends to add from his Facebook™ list of friends, or the like, as shown in FIG. 9. Similarly, a user may be allowed to add contacts to her application contacts ("Contacts" in FIG. 4).

Figure 10:
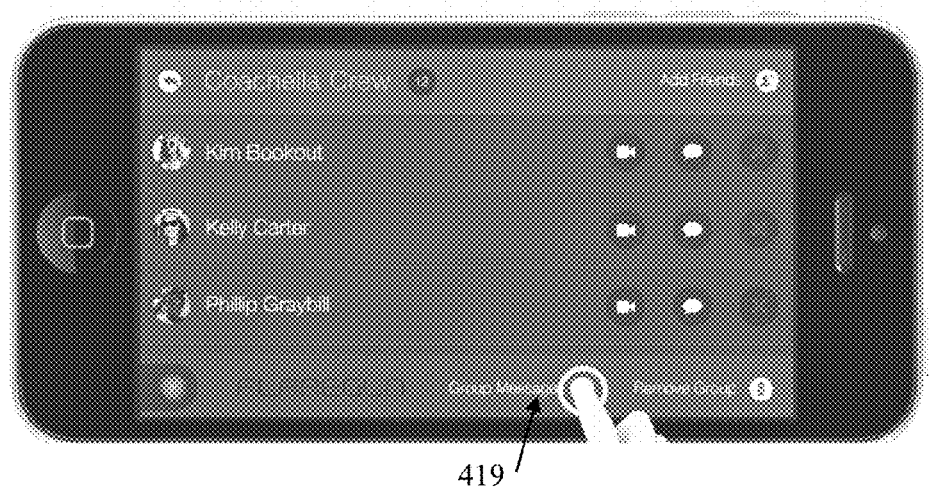
Figure 11:
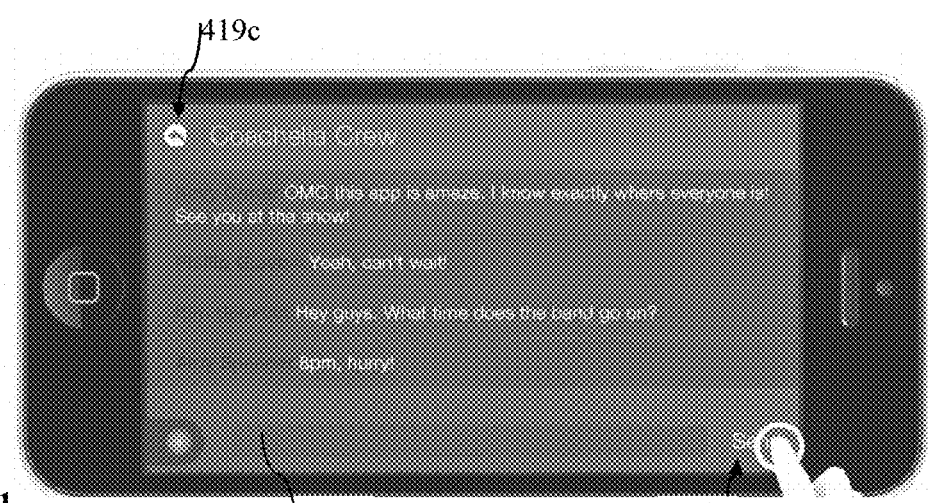

Referring now to FIGS. 10-11, when the user selects "Group Messages" 419 (FIG. 10), the application may be configured to open up that group's messages screen (FIG. 11) displaying the messages exchanged by the group members. On the same screen, the user may tap an input field 419*a*, which causes the Apple™ OS keyboard to reveal so that the user can type his message in the text box 419*a*. Next, the user may hit a "Send" button 419*b* to post the message to the entire group. Next, the user may swipe or tap a "Back" button 419*c*, to return to Group screen (FIG. 10).

Figure 12:
Figure 13:
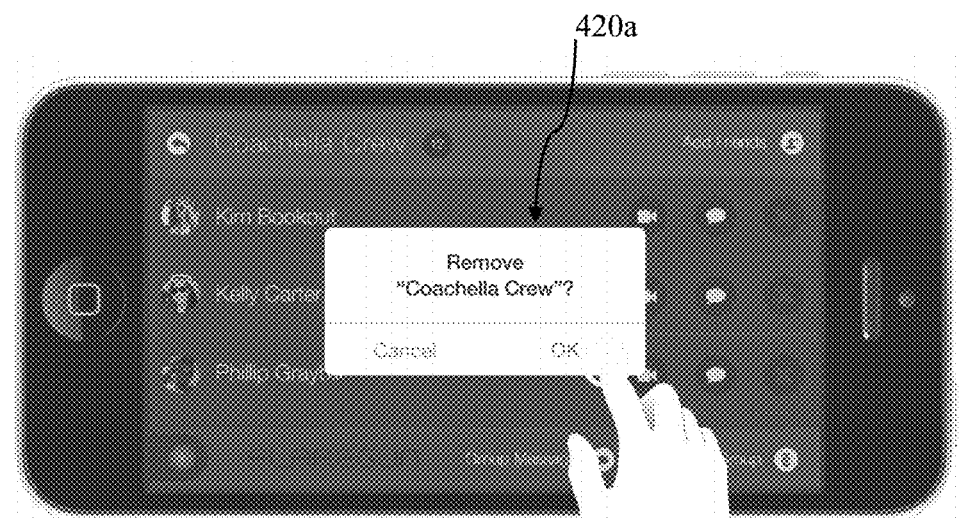
Figure 14:
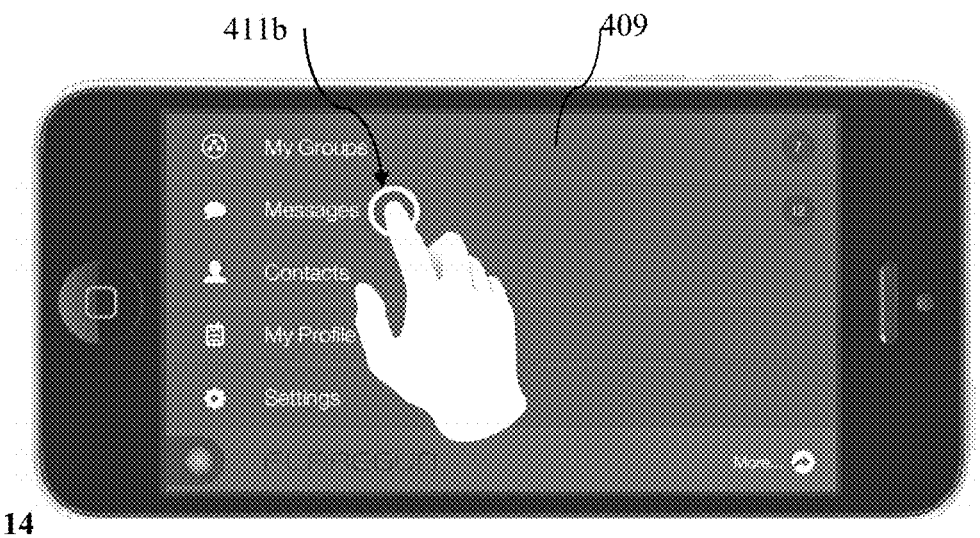

Referring now to FIGS. 12-13, it is shown that the user may select "Remove Group" 420 to delete the current group. Typically, a user may delete only the groups she created or if she is an administrator/operator of the application. Otherwise, by deleting a group, the user would be leaving the group and unable to view the other group members. An alert popup 420*a* (FIG. 13), asking for confirmation, may also be displayed to the user.

Figure 15:
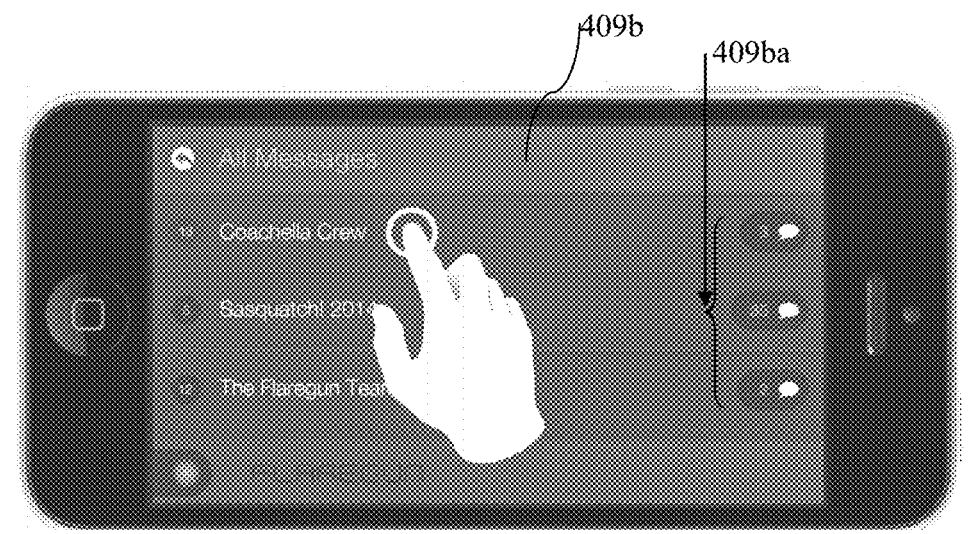
Figure 16:
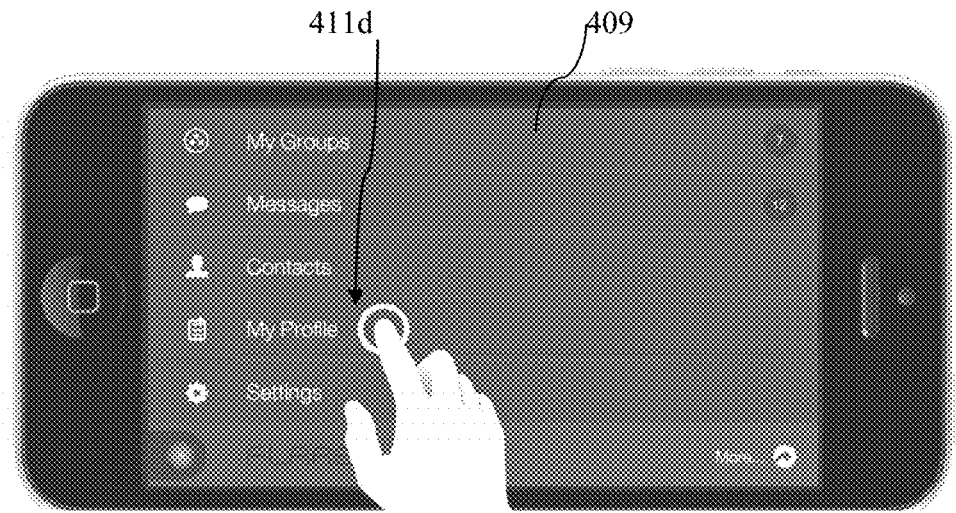
Figure 17:
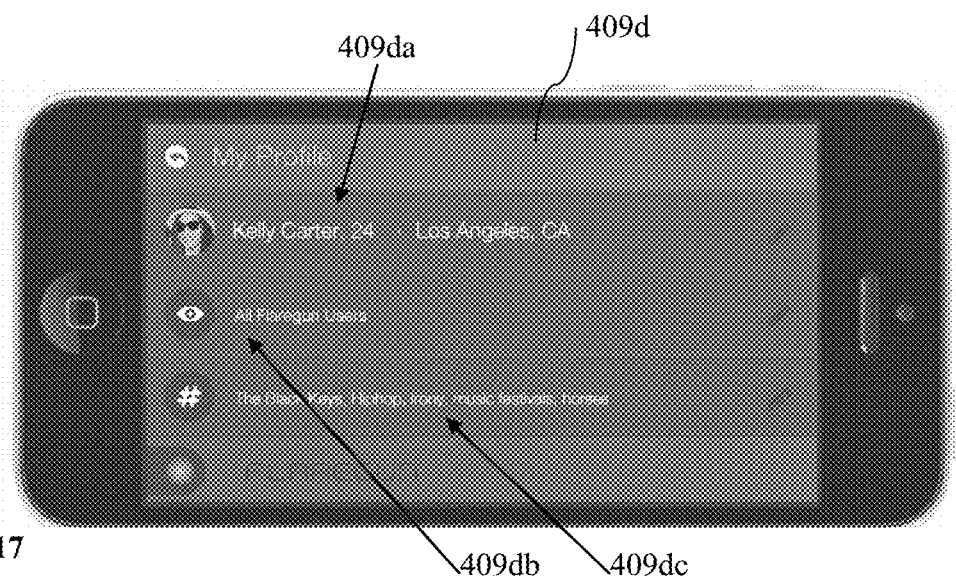
Figure 18:
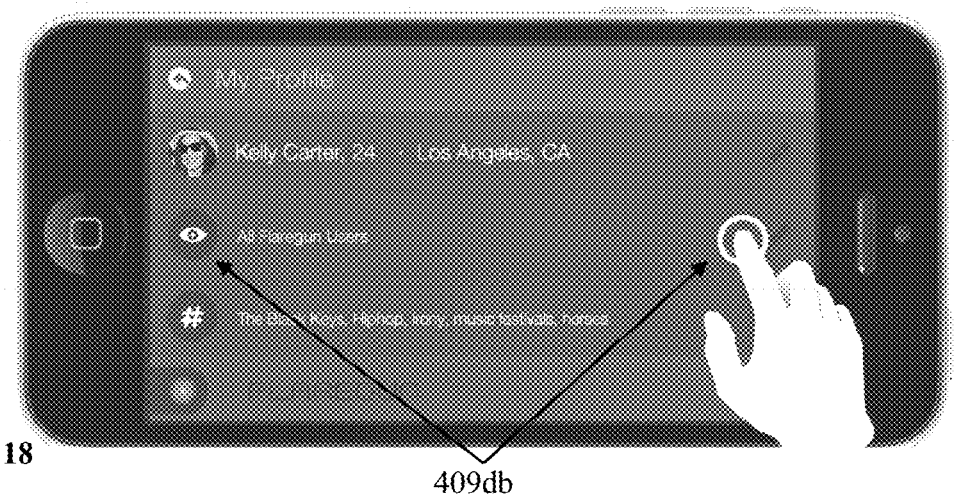

From the main menu screen 409 (FIG. 14), the user may select "Messages" 411*b* to open an "All Messages" screen 409*b* (FIG. 15). On that screen, the user may be shown the total number of messages 409*ba* associated with each group. The user may also select a group to view group's messages and/or send messages to that group as described earlier when referring to FIG. 11.

Figure 19:
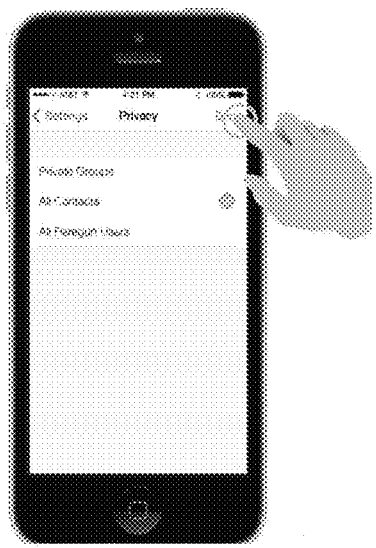
Figure 20:
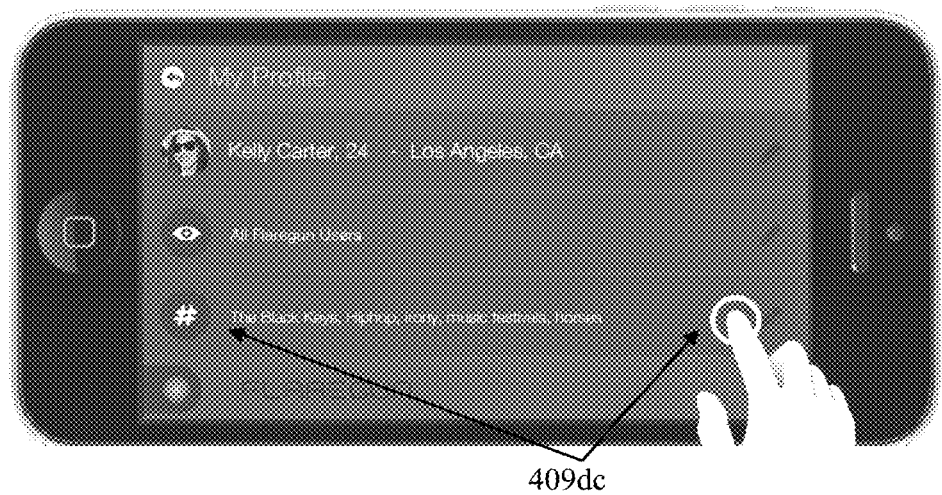
Figure 21:
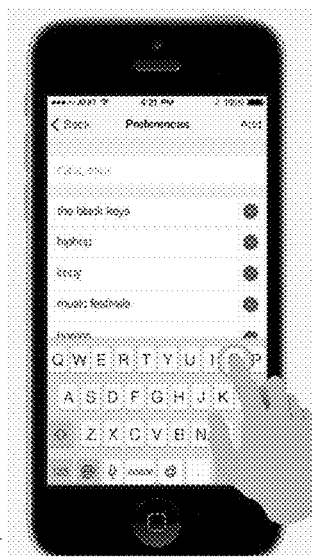

Referring now to FIGS. 16-21, it is shown that on the main menu screen 409, the user may select "My Profile" 411*d*, to view and/or edit her information on a profile screen 409*d*. The main profile data 409*da*, as shown, may include a user's photograph, name, age and/or data about her location. The user may, for example, tap the mail profile data 409*da* to view and edit the respective profile information. From the profile screen 409*d* (FIG. 17), for example, the user may also be provided with the option to access other profile settings such as her privacy settings 409*db* and preferences 409*dc*. The user may for example tap to view and/or edit privacy settings (see 409*db* in FIG. 18; see also FIG. 19). As shown in FIG. 19, privacy settings options may include "Private Groups," "All Contacts," and "All Application/Flaregun Users". The user may also tap to view and edit preferences 409*dc* (FIGS. 20-21). User may type keywords or phrases into the input field to add personal preferences or may delete existing preferences. Keywords and phrases should typically be separated by a comma.

Figure 22:
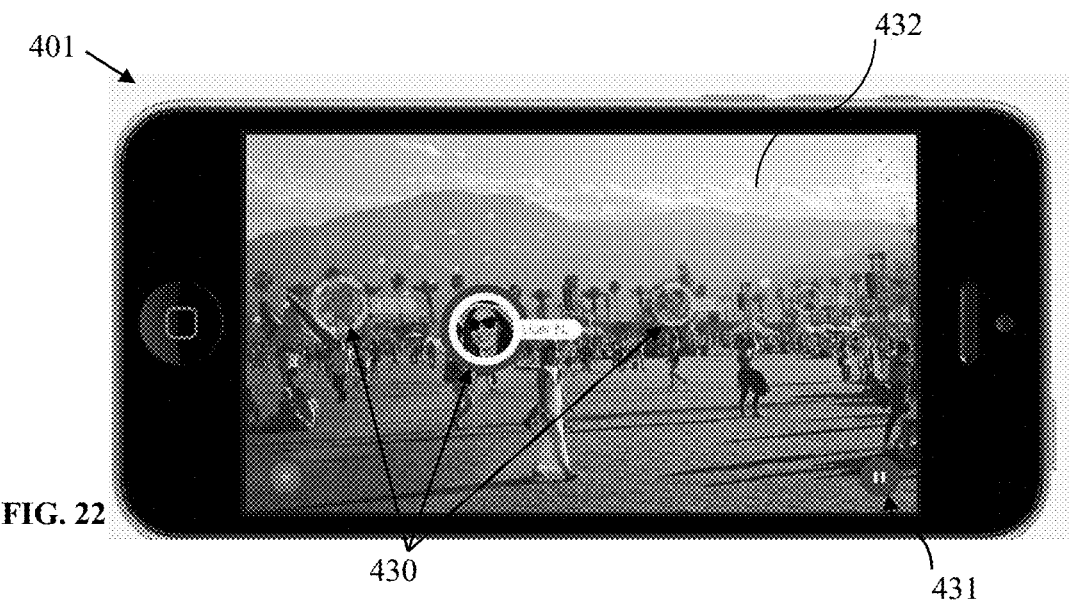

FIG. 22 shows the application in scope view/mode on the user's mobile device 401. After launching the application, the scope may be activated in various ways, such as by taping a "Finder" button (see FIG. 1), taking the mobile device's camera out of the bird's eye view, or by pointing the camera at the surroundings as shown in FIG. 22. A purpose of the scope mode may be to visually connect with friends, family members, professional colleagues, work colleagues, and the like, who typically will be members of the application groups created by the user, or groups the user is part of (see 411*aa* in FIG. 6 for example). These real time visual connection features provide not only for, for example, a better social media experience, but provides various other benefits as well, such as meeting, locating, and/or finding a person (e.g., friend or family member), and/or their mobile devices, in large spaces (e.g., a mall, college campus, show venues, ski resorts, airports, etc), and/or in large crowds, such as at a concert (see FIG. 32).

The application may be configured to allow the user to scan the crowd or the large space, and the augmented reality module may overlay a representation 430/FIG. 22 (e.g., icon or photograph, plus name, location and/or distance) of each group member over a point in the scope image 432 having the position coordinates (e.g., latitude and longitude) corresponding with the position coordinates of the group member's mobile device. Again, as described earlier when referring to FIG. 1, the determination of the location of a group member in the scope image 432 may be facilitated by the mobile device's 401 (FIG. 22) gyroscope and GPS module (see FIG. 1) which may provide the data necessary to determine what is the user mobile device's 401 camera looking at (i.e., by knowing the orientation and location/position of the user mobile device 401 and thus its camera). In addition, as mentioned earlier, the group members' 430 position may be known from the GPS coordinates supplied by group members' mobile devices to the application server 103 (FIG. 1).

Thus, for example, the user holding her mobile device 401 in her hand, in scope view, may choose to walk toward a particular group member appearing in scope in order to meet that group member in person. Or, as another example, within the application, the user could start a social media interaction (e.g., text messages, video or audio chat, etc) with one or more group members (including simultaneously) appearing in scope.

As suggested in FIG. 22, some of the user representations 430 may be faded out and/or a size scaling effect may be used on them to correlate with the group member's distance. The group member that is the furthest away will preferably have the smallest (and/or most faded) representation (e.g., icon) and the closest will have the largest (and/or less faded), with preferably at least three size points in between, to indicate depth of field. Other similar graphical effects may also be used.

Figure 23:
Figure 24:
Figure 25:
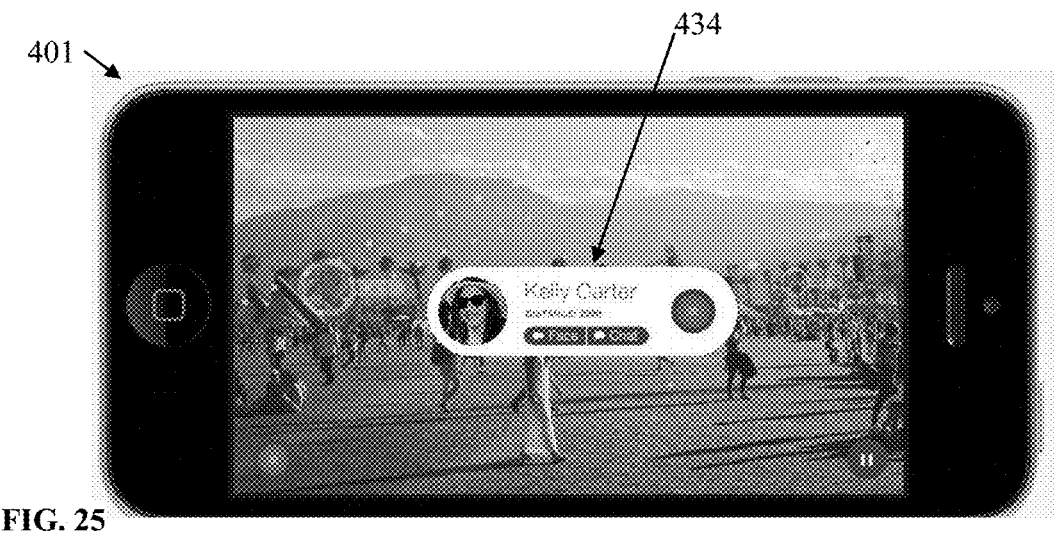
Figure 26:
Figure 27:
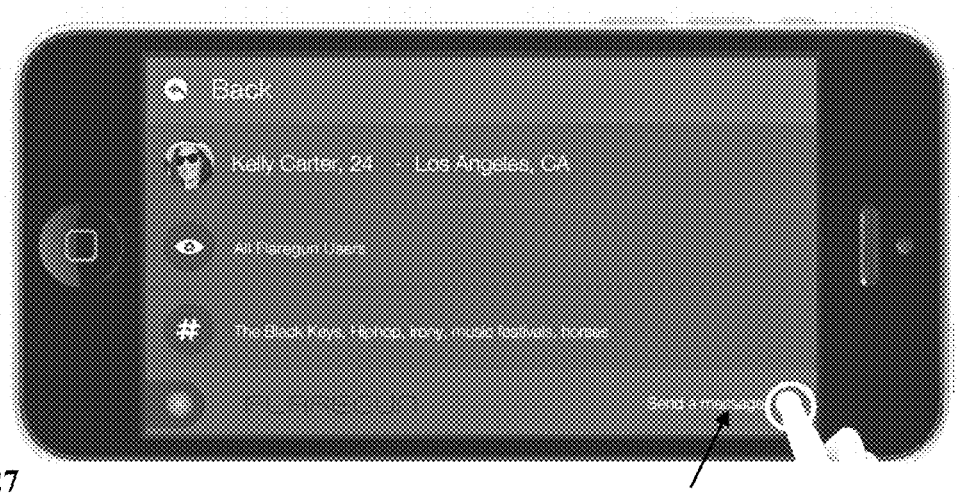
Figure 28:
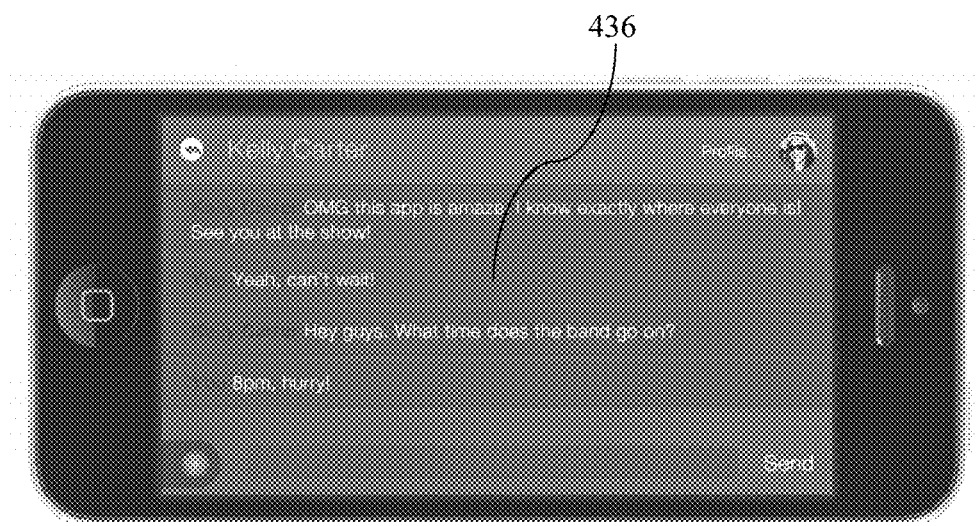

As shown in FIG. 22, when in scope view, a user may tap a pause button 431 to freeze the screen (FIG. 23). Freezing the screen may be useful such as when the user may want to start an interaction with a group member showing up in scope as the freezing may stop any jumping that may come from the user's camera movement. For example, tapping a group member's icon 433 (see FIG. 24) may cause the expansion of that group member's container 434 (FIG. 25), revealing several options, such as to send messages, start a video chat, or the like. After the container 434 is expanding, tapping for example a "Face" button (see FIG. 25) may cause to connect the user of the mobile device 401 with the group member from the container 434 via a video chat application such as Apple™ Facetime™. As another example, tapping a "Chat" button in the container 434 (see FIG. 25) may cause a connection via text message. Further, tapping anywhere else (see FIG. 26) on the expanded container 434 may take the user to that group member's profile, to view more information about that user, such as her preferences, and see additional options (see FIG. 27). Selecting "Send a message" 435 on that user's profile screen may open a chat dialog screen 436 for the user and that group member (peer-to-peer messaging; see FIG. 28).

It should be understood that, for example, the representations 430 (FIG. 22) of the group members appearing in scope may include a real time video, so real time video chat may be held simultaneously in scope view with, for example, all or some of the group members appearing in scope. Similarly, same real time video chat may be held in bird's eye view as well. These inventive aspects may even further augment the benefits of the application described herein.

A "Settings" button may also be provided on the main menu screen (see FIG. 4 for example). By taping "Settings" a user may change application settings such as the range of scope view, general account data or privacy settings.

Figure 29:
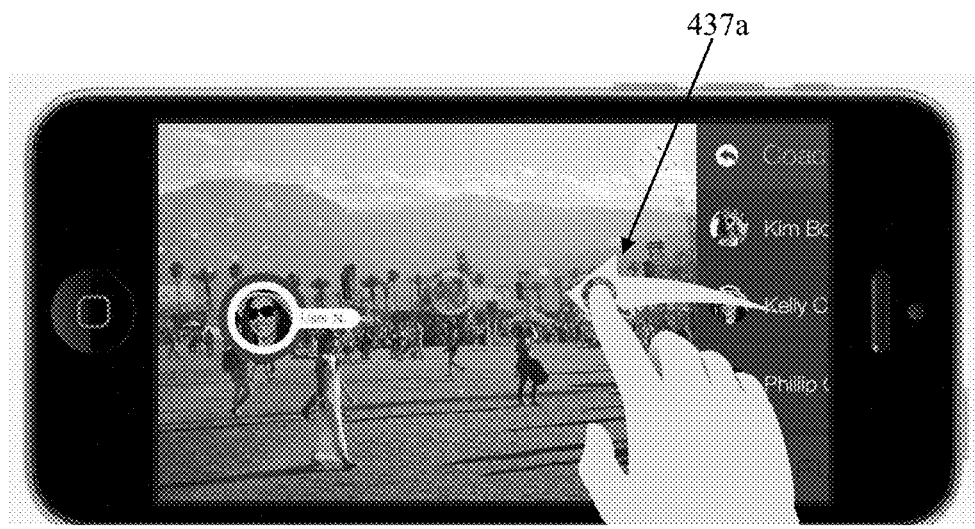
Figure 30:
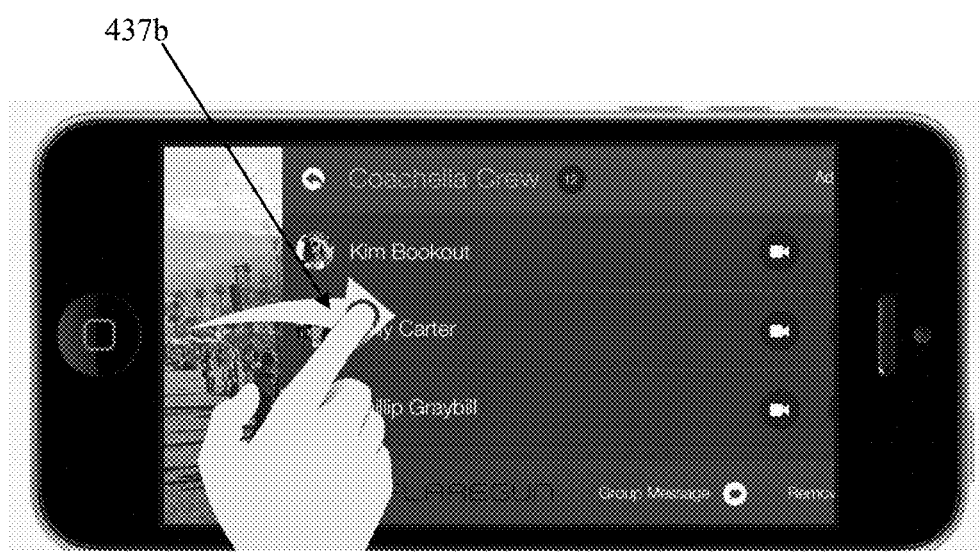

Referring now to FIGS. 29-31, when in scope mode, the user may be provided with the option to swipe left 437a (FIG. 29) to reveal the current Group screen (as seen in FIG. 7) or to swipe right 437b (FIG. 30) to return to the Scope screen. Again, as mentioned earlier in this description, in scope view as well, selecting the application logo/button 412 (FIG. 31) will take the user to the Main Menu (as seen in FIG. 4). This button lives on most of the application's screens.

FIG. 32 illustrates an example of use of an apparatus and method for visually connecting people, according to an embodiment. As shown, a user may point her mobile device 401 in scope view to a large crowd (e.g., at a concert) to locate her friends and/or start one or more of the interactions described herein with one or more of the friends appearing in scope.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the described methods. Acts, elements and features discussed only in connection with one embodiment are not intended to be excluded from a similar role in other embodiments.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

For means-plus-function limitations recited in the claims, if any, the means are not intended to be limited to the means disclosed in this application for performing the recited function, but are intended to cover in scope any means, known now or later developed, for performing the recited function.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A mobile device comprising a processor, a display, a camera, a GPS sensor, an orientation sensor, and an application for visually connecting people, which when launched by a user, enables the mobile device to perform operations comprising: detecting a current GPS position of the user; displaying a user representation of the user's GPS position on a map; detecting a current location of members of a group, which the user created or is a member of, if the group members have a similar mobile device having the application for visually connecting people and if they have set the application for visually connecting people to detect their GPS position and to permit their visibility when the user or other group members wish to locate them by scanning their surroundings live, with the camera of their mobile device; determining what the mobile device's camera is seeing during the live scanning using the orientation sensor and the GPS sensor; and, for each group member detected while the user is scanning user's surroundings with the camera of the mobile device, said each group member having a GPS position corresponding with a point in a direction the mobile device's camera points to at a particular moment during the scanning, displaying on the mobile device's display a live image of the surroundings as captured by the camera of the mobile device during the live scanning and a group member representation associated with the group member's GPS position over said live image.

2. The mobile device of claim 1, wherein the group member representation comprises a photograph and name of that group member and a distance from the user's mobile device to that group member, and wherein, based on the group member's GPS position, the group member's representation is overlaid over a corresponding GPS position of a point in a real time image of a physical environment of that group member captured by the user mobile device's camera while scanning user's surroundings.

3. The mobile device of claim 2, wherein the physical environment of that group member comprises people and group members randomly dispersed within the physical environment.

4. The mobile device of claim 3, wherein the current location of group members includes city name, distance and GPS coordinates.

5. The mobile device of claim 1, wherein the operations further comprise enabling the user and any group member to set the range of their visibility to other group members' mobile devices, the range of their mobile device's capability to detect other group members, or both.

6. The mobile device of claim 1, wherein the operations further comprise enabling the user and any group member to set and receive an alert if they are within a set distance from blocked or listed individuals.

7. The mobile device of claim 1, wherein the user representation includes an icon which the user can name and which the user can save on the map for viewing later.

8. The mobile device of claim 1, wherein the displaying of the user representation of the user GPS position on a map is occurring only when the camera of the user's mobile device is turned in bird's eye view.

9. The mobile device of claim 1, wherein each displayed group member representation comprises a video, audio or text chat button, which the user may actuate to commence communication with one group member or with several, simultaneously.

10. The mobile device of claim 1, wherein each displayed group member representation comprises a media exchange button, which the user may actuate to commence an exchange of media with one group member or with several, simultaneously.

11. The mobile device of claim 1, wherein the operations further comprise communicating with a server to receive map data and communicating with another server to send and receive updates about the GPS position of group members.

12. A method for visually finding and interacting with people, operable on a computing system including a server and a mobile device comprising a processor, a display and a camera, the method comprising: detecting a current location of members of a group, which a user of the mobile device has created or is a member of, if the group members have similar mobile devices having the application for visually connecting people and if they have set the application for visually connecting people to allow detection of their location and to permit their visibility when the user or other group members wish to locate them by scanning their surroundings live with the camera of their mobile device; and, for each group member detected while the user is scanning user's surroundings live, and having a position falling in a direction the mobile device's camera points to at a particular moment, displaying on the mobile device's display a live image of the surroundings as captured by the camera of the mobile device during the live scanning and a group member representation associated with the group member's position over said live image.

13. The method of claim 12, wherein the group member representation comprises an icon and name of that group member, and a distance from the user's mobile device to that group member, and wherein, based on the group member's position, the group member's representation is overlaid over a corresponding position of a point in a real time image of a physical environment of that group member captured by the user mobile device's camera while scanning user's surroundings.

14. The method of claim 12, wherein each displayed group member representation comprises a video, audio or text chat button, which the user may actuate to interact in real time with a group member or with several, simultaneously.

15. The method of claim 12 further comprising creating, by the user, by sending invitations to user's contacts, a plurality of groups categorized by interests, for the purpose of selective and real time finding and interacting with their members, such that when the user later selects a group, a list of members of that group is loaded into the user's mobile device from the server, with data about their most recent position.

16. The method of claim 12 further comprising freezing the display of user's mobile device after the user scanned user's surroundings to locate group members, such that the user can interact with the group members who's representations are displayed, without chasing them on the display due to camera movements.

17. The method of claim 12 further comprising providing a compass in the top right corner of the display to indicate all group members' location relative to each other and the direction of scanning.

18. The method of claim 12 further comprising fading and downsizing some of the displayed group members' representations during scanning, according to the group member's distance from the user's mobile device.

19. A method for visually finding and for social media interacting with people, operable on a computing system including a server and a mobile device comprising a processor, a display and a camera, the method comprising:

providing an application for visually connecting people installable in the mobile device;

creating a group of members, each group member having a mobile device with the application for visually connecting people installed;

providing settings in the application for visually connecting people for group members to allow detection of their location by the application;

providing settings in the application for visually connecting people for group members to permit their visibility when other group members wish to locate them;

detecting a current location of members of a group who permit visibility, by a member of the group, by scanning the member's surroundings live, with the camera of the member's mobile device; and, providing an augmented reality module to overlay a representation of each group member detected over a point in a scope image obtained during the live scanning, the point having location coordinates corresponding with a current location of the group member's mobile device.

20. The method of claim 19, wherein each overlayed group member representation comprises a video, audio or text chat button, which the member may actuate to commence communication with one group member or with several, simultaneously.

* * * * *